United States Patent
Je et al.

(10) Patent No.: US 12,005,972 B2
(45) Date of Patent: Jun. 11, 2024

(54) APPARATUS AND METHOD FOR CONTROLLING STEERING OF ELECTRIC POWER STEERING SYSTEM

(71) Applicant: HYUNDAI MOBIS CO., LTD., Seoul (KR)

(72) Inventors: Sung Kyu Je, Yongin-si (KR); Sung Jong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 726 days.

(21) Appl. No.: 17/151,572

(22) Filed: Jan. 18, 2021

(65) Prior Publication Data

US 2022/0169303 A1 Jun. 2, 2022

(30) Foreign Application Priority Data

Dec. 1, 2020 (KR) .................. 10-2020-0165505

(51) Int. Cl.
*B62D 5/04* (2006.01)

(52) U.S. Cl.
CPC ........... *B62D 5/046* (2013.01); *B62D 5/0469* (2013.01)

(58) Field of Classification Search
CPC .... B62D 5/046; B62D 5/0469; B62D 5/0457; B62D 6/00; B62D 6/002; B62D 6/007
See application file for complete search history.

(56) References Cited

U.S. PATENT DOCUMENTS

| 10,427,708 | B2 | 10/2019 | Kim et al. |
| 2017/0197654 | A1 | 7/2017 | Kim et al. |
| 2018/0346018 | A1* | 12/2018 | Kataoka .............. B62D 5/0463 |

FOREIGN PATENT DOCUMENTS

| JP | 2011-168168 | 9/2011 |
| KR | 10-2017-0084762 | 7/2017 |
| KR | 10-2019-0034950 | 4/2019 |

* cited by examiner

*Primary Examiner* — Ian Jen
*Assistant Examiner* — Renee LaRose
(74) *Attorney, Agent, or Firm* — NSIP Law

(57) ABSTRACT

A steering control apparatus and method of an electric power steering (EPS) system for a vehicle includes a learning module configured to learn a learning end angle based on an end angle of an end of a rack bar based on a steering angle, an angular speed limit module configured to detect a target limit angular speed based on the learning end angle and the steering angle, detect an actual motor angular speed based on a steering angular speed, generate a limit current based on an error between the target limit angular speed and the actual motor angular speed, and limit the steering angular speed within the target limit angular speed, and a motor current generation module configured to generate a motor current for motor control based on the limit current and a command current received from a steering control module.

14 Claims, 6 Drawing Sheets

APPARATUS AND METHOD FOR CONTROLLING STEERING OF ELECTRIC POWER STEERING SYSTEM

CROSS-REFERENCE TO RELATED APPLICATION

This application claims priority from and the benefit of Korean Patent Application No. 10-2020-0165505, filed on Dec. 1, 2020, which is hereby incorporated by reference for all purposes as if set forth herein.

BACKGROUND

Field

Exemplary embodiments of the present disclosure relate to a steering control apparatus and method of an electric power steering (EPS) system for a vehicle, and more particularly, to a steering control apparatus and method of an EPS system for a vehicle, for preventing a steering wheel from mechanically coming into contact with a left or right end.

Discussion of the Background

In an electric power steering (EPS) system, an electronic control unit (ECU) imparts a light and comfortable feeling of steering upon low-speed operation and imparts excellent direction stability along with a heavy feeling of steering upon high-speed operation by driving a motor based on an operating condition for a vehicle detected by a vehicle speed sensor, a steering sensor, a torque sensor, etc. Furthermore, the EPS system provides a rapid restoring force of a steering wheel based on a rotation angle of the steering wheel so that rapid steering is performed in an emergency situation, thus providing a user with an optimal steering condition.

The EPS system assists the steering force of a driver by rotating a steering shaft through the motor installed outside a steering column disposed between the steering wheel and a gear box so that the rotatory power of the steering wheel by the driver is downward transferred.

In the EPS system, when a driver rotates the steering wheel to a right or left end thereof, a mechanical collision occurs between a stopper of a rack bar and a gear box housing. The rack bar is a bar parallel to the front axle that moves left or right when the steering wheel is turned. The gear box includes gears that transmit a driver's steering inputs to the steering linkage that turns the wheels, and it multiplies the driver's steering changes so that the front wheels move more than the steering wheel. In order to prevent the collision, the EPS system detects a steering location in the rack bar and automatically changes a current of the motor according to a randomly set current table, thus reducing an impact attributable to the collision between a stopper of the rack bar between the rack bar and the gear box housing, reducing noise, and preventing mechanical damage to a part.

Background Technology of the present disclosure is disclosed in Korean Patent Application Publication No. 10-2019-0034950 (Apr. 3, 2019) entitled "APPARATUS AND METHOD FOR VEHICLE STEERING."

The above information disclosed in this Background section is only for enhancement of understanding of the background of the invention and, therefore, it may contain information that does not constitute prior art.

SUMMARY

Conventionally, the EPS system for a vehicle detects a steering location in the rack bar, and performs control by automatically changing a current of the motor for steering driving according to a randomly set current table.

However, the conventional method has a problem in that the steering wheel is not rotated up to an end thereof due to a decrease in maximum output of the EPS system although a driver rotates the steering wheel or a stopped steering wheel is further rotated if a load of a vehicle, such as a low-friction road or creeping driving, is changed. Various embodiments are directed to providing a steering control apparatus and method of an EPS system for a vehicle, which prevent a mechanical collision between the stopper of a rack bar and a gear box housing by learning an end angle of the end of the rack bar when an over load protection (OLP) condition is satisfied and limiting a motor current based on a speed difference between a motor limit speed and an actual motor speed, which is detected based on the learnt end angle.

In an embodiment, a steering control apparatus of an electric power steering (EPS) system for a vehicle includes a learning module configured to learn a learning end angle based on an end angle of an end of a rack bar based on a steering angle, an angular speed limit module configured to detect a target limit angular speed based on the learning end angle and the steering angle, detect an actual motor angular speed based on a steering angular speed, generate a limit current based on an error between the target limit angular speed and the actual motor angular speed, and limit the steering angular speed within the target limit angular speed, and a motor current generation module configured to generate a motor current for motor control based on the limit current and a command current received from a steering control module.

In an embodiment, the learning module includes a condition determination unit configured to determine whether a preset learning condition is satisfied and a learning unit configured to accumulate and store the end angle whenever a result of the determination of the condition determination unit indicates that the learning condition is satisfied and to learn the learning end angle based on the accumulated and stored end angles.

In an embodiment, the condition determination unit includes an over load protection (OLP) operation condition determination unit configured to determine whether an OLP operating condition is satisfied based on column torque and the steering angular speed and a steering angle comparison unit configured to determine whether the steering angle exceeds a preset steering angle.

In an embodiment, the learning unit includes an average value calculation unit configured to accumulate and store a preset number of end angles whenever the learning condition is satisfied and to calculate an average value of the end angles by averaging the accumulated and stored end angles and a learning end angle determination unit configured to add a presetting value to the average value, compare a calculated addition value with the steering angle, and determine the learning end angle based on a result of the comparison.

In an embodiment, the learning end angle determination unit determines the average value as the learning end angle when the addition value is greater than the steering angle.

In an embodiment, the angular speed limit module includes a target limit angular speed detection unit configured to detect the target limit angular speed based on the learning end angle and the steering angle, a motor angular speed detection unit configured to detect the actual motor angular speed, and a limit current detection unit configured to generate the limit current based on the error between the target limit angular speed and the actual motor angular speed and adjust the limit current based on the actual motor angular speed.

In an embodiment, the limit current detection unit includes an error detection unit configured to detect the error between the target limit angular speed and the actual motor angular speed, a limit current generation unit configured to generate the limit current by performing proportional integral (PI) control based on the error, a gain detection unit configured to detect a ramp-up/down gain corresponding to the actual motor angular speed, a limit current adjustment unit configured to adjust the limit current by applying the ramp-up/down gain to the limit current, and a limit current limit unit configured to limit the limit current within a presetting size.

In an embodiment, the ramp-up/down gain is set in a way to reduce the error between the target limit angular speed and the actual motor angular speed.

In an embodiment, the motor current generation module includes a motor current generation unit configured to generate the motor current by adding the limit current and the command current and a motor current limit unit configured to limit the motor current within a range of a preset motor current limit value and input the limited motor current to a motor.

In an embodiment, a steering control method of an electric power steering (EPS) system for a vehicle includes learning a learning end angle based on an end angle of an end of a rack bar based on a steering angle, detecting a target limit angular speed based on the learning end angle and the steering angle, detecting an actual motor angular speed based on a steering angular speed, generating a limit current based on an error between the target limit angular speed and the actual motor angular speed, and limiting the steering angular speed within the target limit angular speed, and generating a motor current for motor control based on the limit current and a command current received from a steering control module.

In an embodiment, the learning of the learning end angle includes determining whether a preset learning condition is satisfied, and accumulating and storing the end angle whenever a result of the determination indicates that the learning condition is satisfied and detecting the learning end angle based on the accumulated and stored end angles.

In an embodiment, the determining of whether the learning condition is satisfied includes determining whether an over load protection (OLP) operation condition is satisfied based on column torque and the steering angular speed, and determining whether the steering angle exceeds a preset steering angle.

In an embodiment, the detecting of the learning end angle includes accumulating and storing a preset number of end angles whenever the learning condition is satisfied and calculating an average value of the end angles by averaging the accumulated and stored end angles, and adding a presetting value to the average value, comparing a calculated addition value with the steering angle, and determining the learning end angle based on a result of the comparison.

In an embodiment, the determining of the learning end angle includes determining the average value as the learning end angle when the addition value is greater than the steering angle.

In an embodiment, the limiting of the steering angular speed within the target limit angular speed includes detecting the target limit angular speed based on the learning end angle and the steering angle, detecting the actual motor angular speed by applying a gear ratio to the steering angular speed, and generating the limit current by performing proportional integral (PI) control based on the error between the target limit angular speed and the actual motor angular speed and adjusting the limit current based on the actual motor angular speed.

In an embodiment, the adjusting of the limit current based on the actual motor angular speed includes detecting the error between the target limit angular speed and the actual motor angular speed, generating the limit current by performing the PI control based on the error, detecting a ramp-up/down gain corresponding to the actual motor angular speed, adjusting the limit current by applying the ramp-up/down gain to the limit current, and limiting the limit current within a presetting size.

In an embodiment, the ramp-up/down gain is set in a way to reduce the error between the target limit angular speed and the actual motor angular speed.

In an embodiment, the generating of the motor current includes generating the motor current by adding the limit current and the command current, and limiting the motor current within a range of a preset motor current limit value and inputting the limited motor current to a motor.

The steering control apparatus and method of an EPS system for a vehicle according to an aspect of the present disclosure prevent a mechanical collision between the stopper of the rack bar and the gear box housing by learning an end angle of the end of the rack bar when an over load protection (OLP) condition is satisfied and limiting a motor current based on a speed difference between a motor limit speed and an actual motor speed, which is detected based on the learnt end angle.

The steering control apparatus and method of an EPS system for a vehicle according to another aspect of the present disclosure prevent a stopped steering wheel from being further rotated if a steering wheel is not rotated up to an end thereof due to a decrease in maximum output of the EPS system or a load of a vehicle, such as a low-friction road or creeping driving, is changed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
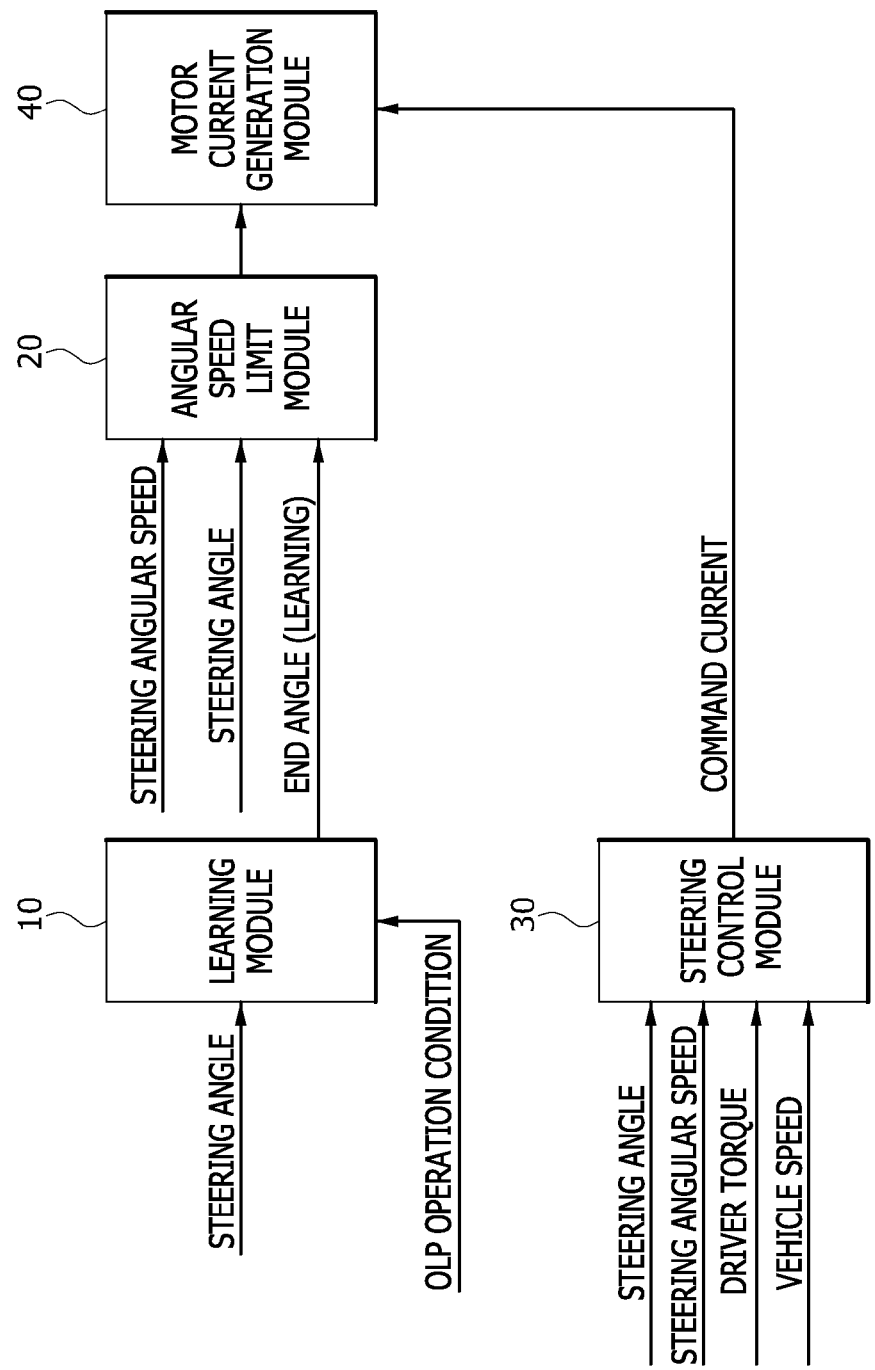
FIG. 1 is a block diagram illustrating a steering control apparatus of an electric power steering (EPS) system for a vehicle according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a steering control apparatus and method of an electric power steering (EPS) system for a vehicle will be described below with reference to the accompanying drawings through various exemplary embodiments. The thicknesses of lines or the sizes of elements in the drawings may have been exaggerated for the clarity of a description and for convenience' sake. Furthermore, terms to be described below have been defined by taking into consideration their functions in the present disclosure, and may be different depending on a user or operator's intention or practice. Accordingly, such terms should be defined based on the overall contents of this specification.

Figure 2:
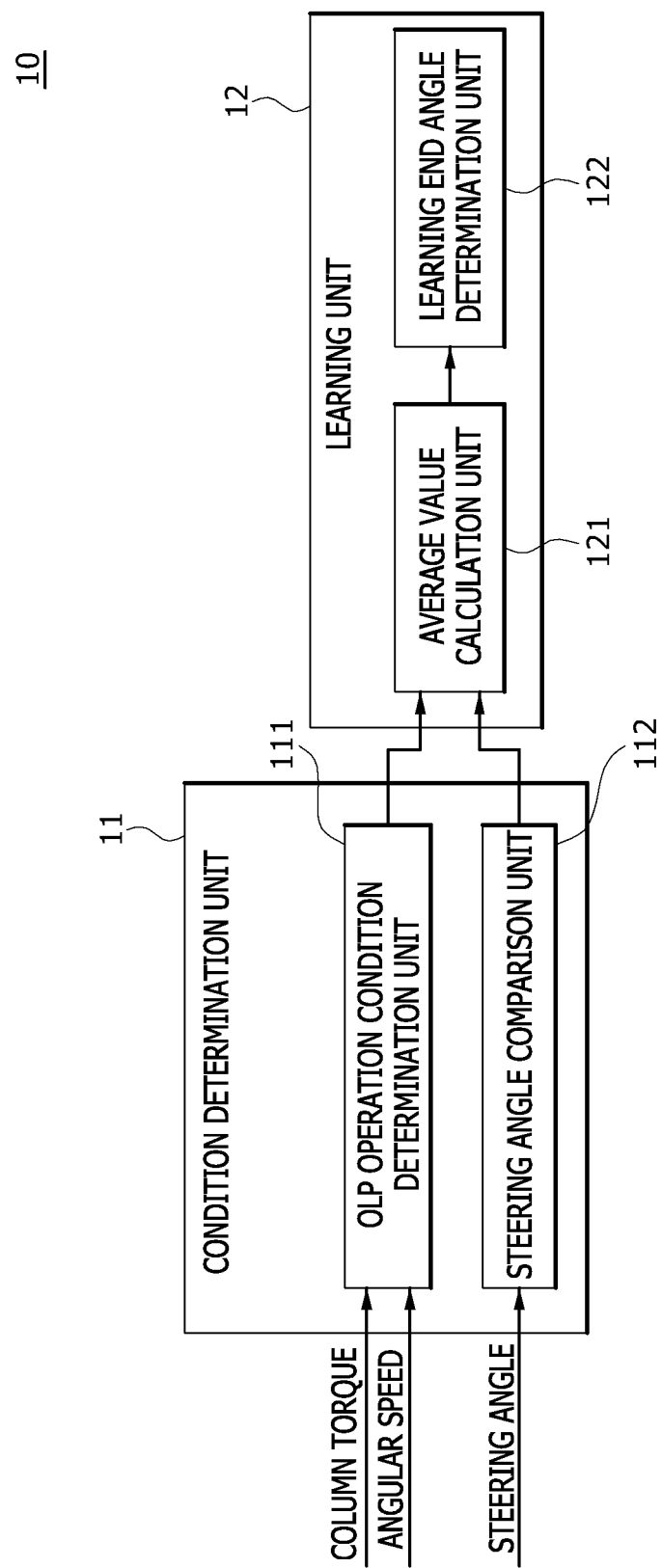
FIG. 2 is a block diagram illustrating a learning module according to an embodiment of the present disclosure.
Figure 3:
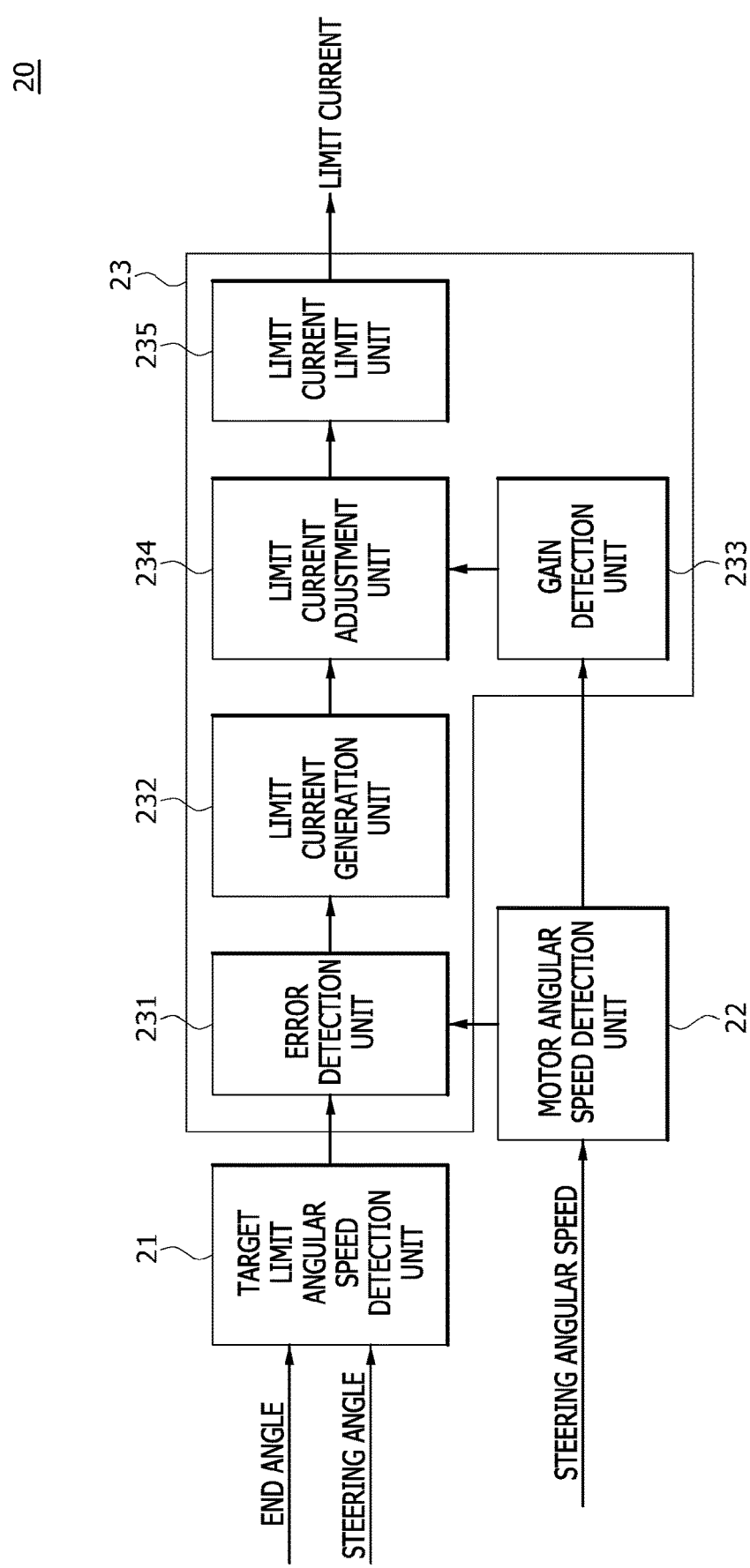
FIG. 3 is a block diagram illustrating an angular speed limit module according to an embodiment of the present disclosure.
Figure 4:
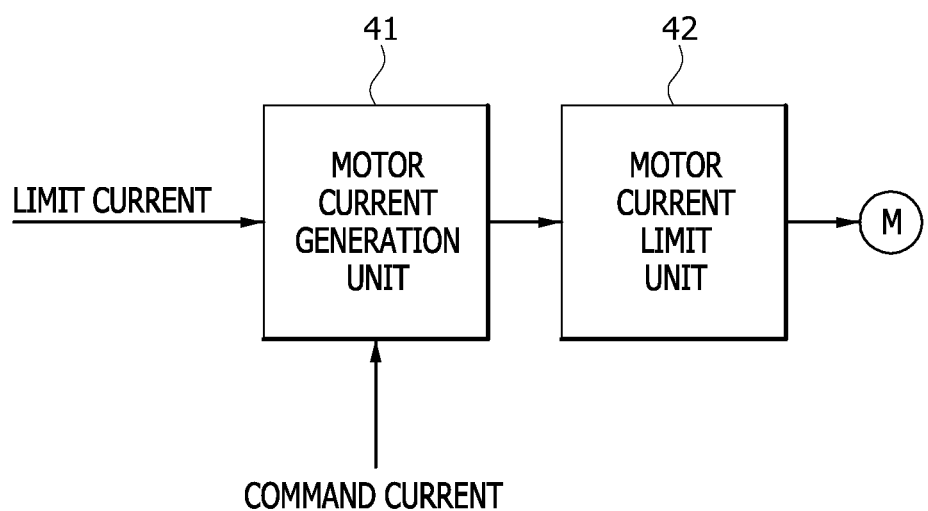
FIG. 4 is a block diagram illustrating a motor current output module according to an embodiment of the present disclosure.

FIG. 1 is a block diagram illustrating a steering control apparatus of an EPS system for a vehicle according to an embodiment of the present disclosure. FIG. 2 is a block diagram illustrating a learning module according to an embodiment of the present disclosure. FIG. 3 is a block diagram illustrating an angular speed limit module according to an embodiment of the present disclosure. FIG. 4 is a block diagram illustrating a motor current output module according to an embodiment of the present disclosure.

Referring to FIG. 1, the steering control apparatus of an EPS system for a vehicle according to an embodiment of the present disclosure includes a learning module 10, an angular speed limit module 20, a steering control module 30, and a motor current generation module 40.

The learning module 10 determines whether a preset learning condition is satisfied based on a steering angle of a vehicle, accumulates and stores an end angle of a steering wheel whenever the learning condition is satisfied, and learns a learning end angle based on the accumulated and stored end angles. An end angle is a steering angle at a timing at which the OLP operation condition is satisfied and the steering angle exceeds the set steering angle. The learning end angle is an angle obtained as an end angle through the learning of the end angle.

Referring to FIG. 2, the learning module 10 includes a condition determination unit 11 and a learning unit 12.

The condition determination unit 11 determines whether a preset learning condition is satisfied. The condition determination unit 11 includes an over load protection (OLP) operation condition determination unit 111 and a steering angle comparison unit 112.

The OLP operation condition determination unit 111 determines whether an OLP operation condition for performing an OLP function is satisfied based on column torque and a steering angular speed.

The OLP function limits motor output when a specific condition is satisfied, in order to prevent a maximum current from continuously flowing from a wheel end upon steering.

In general, in the EPS system, if the steering wheel is rotated to both ends thereof, a high current is applied to generate great output, so that a motor, an engine control unit (ECU), a motor control unit (MCU), etc. may fail or may be damaged due to heat. An end of a steering wheel may refer to a final rotation point in either direction, clockwise or counter-clockwise.

The OLP function prevents a motor or an ECU (or MCU) from failing or being damaged due to heat generated in the EPS system by the application of a high current. The OLP function determines a maximum current based on load information and steering angle information of the steering wheel when a driver rotates the steering wheel to a maximum, and reduces heat generated in the EPS system by limiting a current.

The steering angle comparison unit 112 compares a steering angle with a preset steering angle and determines whether the steering angle exceeds the set steering angle.

The set steering angle is a steering angle previously set, to determine whether the steering wheel has been rotated to an end thereof. Accordingly, when the steering angle is the set steering angle or more, it may be determined that the steering wheel is very close to the end.

The learning unit 12 accumulates and stores an end angle whenever a result of a determination of the condition determination unit 11 indicates that a learning condition is satisfied and learns a learning end angle based on the accumulated and stored end angles.

As noted above, the end angle is a steering angle at a timing at which the OLP operation condition is satisfied and the steering angle exceeds the set steering angle.

In general, if a driver rotates the steering wheel to the end thereof, the OLP operation condition is satisfied, and the steering angle exceeds the set steering angle.

Accordingly, when the driver rotates the steering wheel to the end thereof, the learning unit 12 accumulates and stores an end angle whenever the learning condition is satisfied, and learns a learning end angle based on the accumulated and stored end angles.

The learning unit 12 includes an average value calculation unit 121 and a learning end angle determination unit 122.

When a driver rotates the steering wheel to the end thereof, the average value calculation unit 121 detects an end angle whenever the condition determination unit 11 determines that a learning condition is satisfied. In this case, the average value calculation unit 121 detects a set number of end angles.

Thereafter, the average value calculation unit 121 adds the set number of detected end angles, and calculates an average value of the end angles by dividing the added end angles by a set number.

The learning end angle determination unit 122 adds a presetting value to the average value calculated by the average value calculation unit 121, compares an addition value of the average value and the setting value with a steering angle, and determines a learning end angle based on a result of the comparison.

In this case, when the addition value is greater than the steering angle, the learning end angle determination unit 122 determines the average value as the learning end angle. In contrast, when the addition value is equal to or smaller than the steering angle, the learning end angle determination unit 122 resets the addition value and learns a learning end angle again.

That is, when the addition value is reset, the average value calculation unit 121 detects an average value using the set number of end angles by detecting an end angle whenever it is determined that a learning condition is satisfied, as described above. The learning end angle determination unit 122 compares an addition value of the average value and a setting value with a steering angle, and determines a learning end angle based on a result of the comparison.

In the present embodiment, the set number may be ten times, but the present disclosure is not limited thereto.

The angular speed limit module 20 detects a target limit angular speed based on the learning end angle and the steering angle, detects an actual motor angular speed based on a steering angular speed, generates a limit current based on an error between the target limit angular speed and the actual motor angular speed, and limits the steering angular speed within the target limit angular speed.

Referring to FIG. 3, the angular speed limit module 20 includes a target limit angular speed detection unit 21, a motor angular speed detection unit 22, and a limit current detection unit 23.

The target limit angular speed detection unit 21 detects a target limit angular speed based on a learning end angle and a steering angle.

That is, the target limit angular speed detection unit 21 previously stores an angular speed limit table based on the learning end angle. When a steering angle and the learning end angle are received, the target limit angular speed detection unit 21 detects, in the angular speed limit table, a target limit angular speed set for the learning end angle and the steering angle.

The motor angular speed detection unit 22 detects an actual motor angular speed based on a steering angular speed. The motor angular speed detection unit 22 may calculate the actual motor angular speed by multiplying the steering angular speed by a gear ratio or may previously set the actual motor angular speed for each steering angular speed. A method of detecting, by the motor angular speed detection unit 22, the actual motor angular speed is not specially limited.

The limit current detection unit 23 receives the target limit angular speed and the actual motor angular speed from the target limit angular speed detection unit 21 and the motor angular speed detection unit 22, respectively, generates a limit current based on an error between the target limit angular speed and the actual motor angular speed, and adjusts the limit current based on the actual motor angular speed.

That is, the limit current detection unit 23 generates the limit current based on the error between the target limit angular speed and the actual motor angular speed, and inputs the limit current to the motor so that the steering angular speed can be limited within the target limit angular speed. Accordingly, a mechanical collision between a stopper of a rack bar and a gear box housing can be prevented by controlling the steering angular speed.

The limit current detection unit 23 includes an error detection unit 231, a limit current generation unit 232, a gain detection unit 233, a limit current adjustment unit 234, and a limit current limit unit 235.

The error detection unit 231 detects an error between a target limit angular speed and an actual motor angular speed received from the target limit angular speed detection unit 21 and the motor angular speed detection unit 22, respectively.

The limit current generation unit 232 generates a limit current by performing proportional integral (PI) control based on the error between the target limit angular speed and the actual motor angular speed. That is, the limit current generation unit 232 outputs the limit current for decreasing the error between the target limit angular speed and the actual motor angular speed by performing PI control based on the error between the target limit angular speed and the actual motor angular speed.

The gain detection unit 233 receives the actual motor angular speed from the motor angular speed detection unit 22, and detects a ramp-up/down gain corresponding to the actual motor angular speed.

The ramp-up/down gain is previously set for each actual motor angular speed. The ramp-up/down gain is set to determine whether to apply a limit value to a limit current received from the limit current generation unit 232 and a ratio of the limit value. The ramp-up/down gain is set based on the actual motor angular speed. An increment or decrement of the ramp-up/down gain may be set within a range of +0.1 to −0.005. A maximum value and minimum value of the ramp-up/down gain may be 1 to 0. The ramp-up/down gain may be set in a way to reduce the error between the target limit angular speed and the actual motor angular speed. For example, the ramp-up/down gain is increased at intervals of 0.1 from 0 when the actual motor angular speed is high, and is decreased from 0 at intervals of −0.05 when the actual motor angular speed is low.

The limit current adjustment unit 234 adjusts the limit current by applying the ramp-up/down gain, received from the gain detection unit 233, to the limit current received from the limit current generation unit 232.

That is, in order to reduce the error between the target limit angular speed and the actual motor angular speed, the limit current generation unit 232 generates the limit current. Thereafter, the limit current adjustment unit 234 additionally adjusts the limit current by applying the ramp-up/down gain to the limit current, so that the error between the target limit angular speed and the actual motor angular speed can be further reduced.

For example, the ramp-up/down gain may be increased at intervals of 0.1 from 0 when an actual motor angular speed is high, and may be decreased at intervals of −0.05 from 0 when the actual motor angular speed is low. Accordingly, the ramp-up/down gain may compensate for an error between a target limit angular speed and the actual motor angular speed in a way to reduce the error only when the actual motor angular speed is higher than the target limit angular speed, and may not compensate for the error when the actual motor angular speed is lower than the target limit angular speed.

The limit current limit unit 235 limits the limit current, adjusted by the limit current adjustment unit 234, within a presetting size. That is, the limit current limit unit 235 limits an input limit current within the presetting size, that is, limits a maximum value, and then inputs the maximum value to the motor current generation module 40.

The steering control module 30 assists the steering force of the steering wheel by controlling the motor of the EPS system for a vehicle. The EPS system may be electric power steering (EPS). However, the present disclosure is not limited thereto, and motor driven power steering (MDPS) may also be adopted.

The steering control module 30 receives a steering angle, a steering angular speed, driver torque, a vehicle speed, driving information, etc., and generates a command current based on the steering angle, the steering angular speed, the driver torque, the vehicle speed, the driving information, etc.

The steering control module 30 decreases auxiliary steering torque by decreasing the command current when a vehicle speed is relatively high, and increases the auxiliary steering torque by increasing the command current when the vehicle speed is relatively low.

The motor is installed on a steering shaft, and generates auxiliary steering torque based on a motor current received from the steering control module 30.

The motor current generation module 40 generates a motor current for motor control based on a limit current received from the limit current limit unit 235 and a command current received from the steering control module 30.

Referring to FIG. 4, the motor current generation module 40 includes a motor current generation unit 41 and a motor current limit unit 42.

The motor current generation unit 41 generates a motor current by adding a limit current and a command current.

The motor current limit unit 42 limits the motor current, received from the motor current generation unit 41, within a range of a preset motor current limit value, and inputs the limited motor current to the motor. The motor current limit value is the amount of current set to limit the motor current.

That is, if a driver performs a steering wheel manipulation, such as rotating the steering wheel to both ends thereof, the motor current limit unit 42 decreases heat, generated when the motor is driven, by limiting a motor current based on a motor current limit value. Accordingly, the motor is prevented from being damaged by heat which may be generated by the driving of the motor or from operating abnormally.

A steering control method of the EPS system according to an embodiment of the present disclosure is described in detail below with reference to FIGS. 5 and 6.

Figure 5:
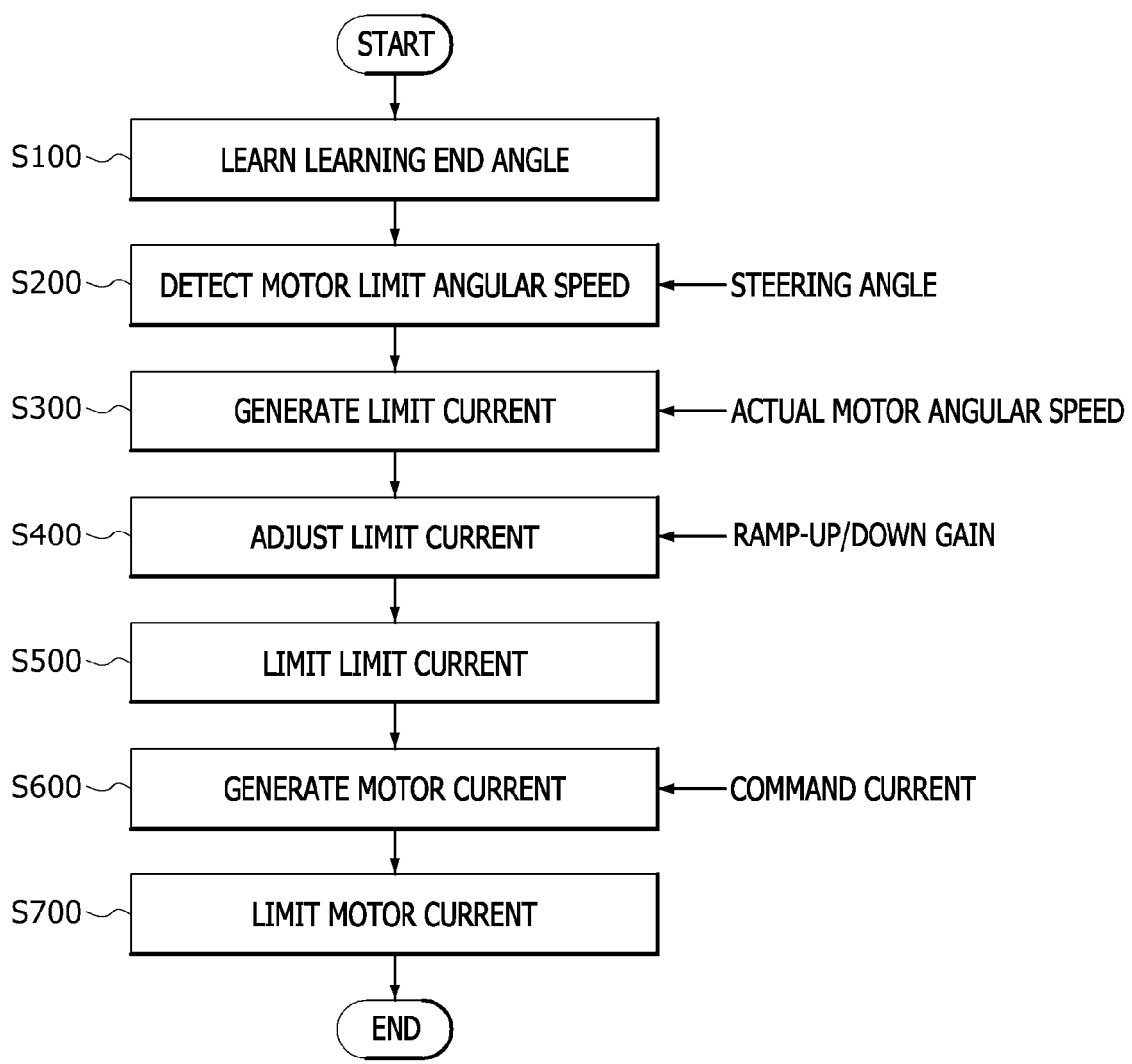
FIG. 5 is a flowchart illustrating a steering control method of the EPS system according to an embodiment of the present disclosure.

FIG. 5 is a flowchart illustrating a steering control method of the EPS system according to an embodiment of the present disclosure. FIG. 6 is a flowchart illustrating a process of learning a learning end angle according to an embodiment of the present disclosure.

Referring to FIG. 5, first, the learning module 10 determines whether a learning condition is satisfied based on a steering angle, accumulates and stores an end angle whenever a result of the determination indicates that the learning condition is satisfied, and learns a learning end angle based on the accumulated and stored end angles (S100).

Figure 6:
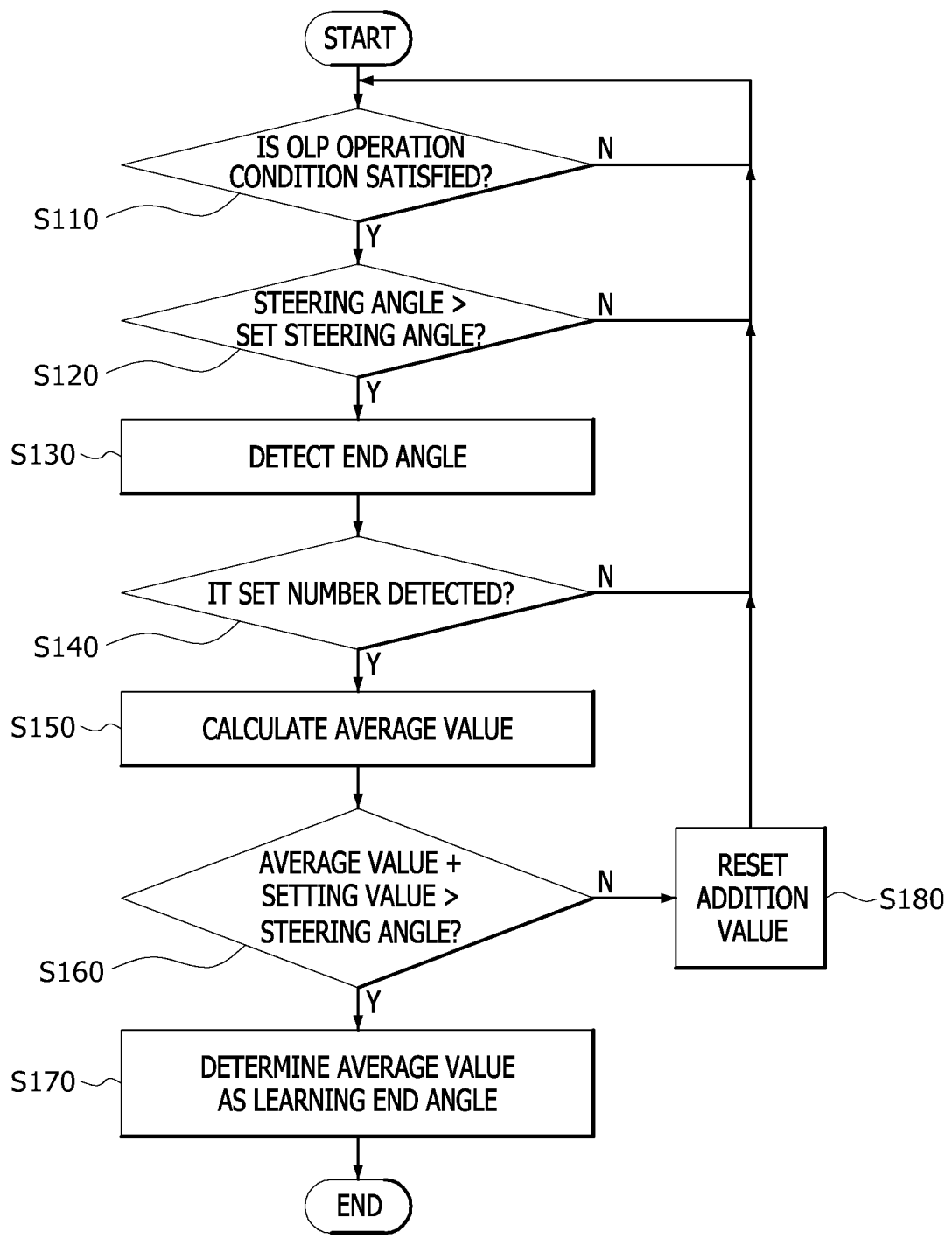
FIG. 6 is a flowchart illustrating a process of learning a learning end angle according to an embodiment of the present disclosure.

That is, referring to FIG. 6, the OLP operation condition determination unit 111 determines whether an OLP operation condition for performing the OLP function is satisfied based on column torque and a steering angular speed (S110).

If, as a result of the determination at step S110, the OLP operation condition is satisfied, the steering angle comparison unit 112 compares the steering angle with a set steering angle and determines whether the steering angle exceeds the set steering angle (S120).

If, as a result of the determination at step S120, the steering angle exceeds the set steering angle, the average value calculation unit 121 detects an end angle (S130).

At this time, the average value calculation unit 121 determines whether a set number of end angles are detected (S140), returns to step S110 if, as a result of the determination, the set number of end angles are not detected, and sequentially performs steps S110, S120 and S130.

If, as a result of the determination at step S140, the set number of end angles are detected, the average value calculation unit 121 adds the set number of detected end angles, and calculates an average value of the end angles by dividing the added end angles by a set number (S150).

Thereafter, the learning end angle determination unit 122 adds a presetting value to the average value calculated by the average value calculation unit 121, and compares an addition value of the average value and the setting value with the steering angle and determines whether the addition value is greater than the steering angle (S160).

If, as a result of the determination at step S160, the addition value is equal to or smaller than the steering angle, the learning end angle determination unit 122 resets the addition value (S180), returns to step S110, and learns a learning end angle again.

In contrast, if, as a result of the determination at step S160, the addition value is greater than the steering angle, the learning end angle determination unit 122 determines the average value as a learning end angle (S170).

When the learning end angle is determined as described above, the target limit angular speed detection unit 21 detects a target limit angular speed based on the learning end angle and the steering angle (S200). The motor angular speed detection unit 22 detects an actual motor angular speed based on the steering angular speed.

Thereafter, the error detection unit 231 detects an error between the target limit angular speed and the actual motor angular speed received from the target limit angular speed detection unit 21 and the motor angular speed detection unit 22, respectively. The limit current generation unit 232 generates a limit current by performing PI control based on the error between the target limit angular speed and the actual motor angular speed (S300).

The gain detection unit 233 receives the actual motor angular speed from the motor angular speed detection unit 22, and detects a ramp-up/down gain. The limit current adjustment unit 234 adjusts the limit current by applying the ramp-up/down gain, received from the gain detection unit 233, to the limit current received from the limit current generation unit 232 (S400).

Thereafter, the limit current limit unit 235 limits the limit current, adjusted by the limit current adjustment unit 234, within a presetting size (S500), and inputs the limit current to the motor current generation module 40.

The steering control module 30 receives a steering angle, a steering angular speed, driver torque, a vehicle speed, driving information, etc., generates a command current based on the steering angle, the steering angular speed, the driver torque, the vehicle speed, the driving information, etc., and inputs the command current to the motor current generation unit 41.

The motor current generation unit 41 generates a motor current by adding the limit current, received from the limit current limit unit 235, and the command current received from the steering control module 30 (S600). Accordingly, the motor current limit unit 42 limits the motor current, received from the motor current generation unit 41, within a range of a preset motor current limit value, and inputs the limited motor current to the motor (S700), thereby driving the motor.

Accordingly, a mechanical collision between the stopper of the rack bar and the gear box housing can be prevented by decreasing the steering angular speed within the target limit angular speed.

As described above, the steering control apparatus and method of the EPS system for a vehicle according to an aspect of the present disclosure prevent a mechanical collision between the stopper of the rack bar and the gear box housing by learning an end angle of the end of the rack bar when an OLP operation condition is satisfied and limiting a motor current based on a speed difference between a motor limit speed and an actual motor speed, which is detected based on the learnt end angle.

Furthermore, the steering control apparatus and method of the EPS system for a vehicle according to another aspect of the present disclosure prevent a stopped steering wheel from being further rotated if a steering wheel is not rotated to an end thereof due to a decrease in maximum output of the EPS system or a load of a vehicle, such as a low-friction road or creeping driving, is changed.

An implementation described in this specification may be realized as a method or process, apparatus, software program, data stream or signal, for example. Although the present disclosure has been discussed in the context of a single form of an implementation (e.g., discussed as a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering control apparatus of an electric power steering system for a vehicle, the apparatus comprising:
    a learning module configured to learn a learning end angle based on an end angle of an end of a rack bar based on a steering angle;
    an angular speed limit module configured to detect a target limit angular speed of the vehicle based on the learning end angle and the steering angle, detect an actual motor angular speed based on a steering angular speed, generate a limit current based on an error between the target limit angular speed and the actual motor angular speed, and limit the steering angular speed within the target limit angular speed; and
    a motor current generation module configured to generate a motor current for motor control based on the limit current and a command current received from a steering control module,
    wherein:
    the learning module comprises:
        a condition determination unit configured to determine whether a preset learning condition is satisfied; and
        a learning unit configured to accumulate and store the end angle whenever a result of the determination of the condition determination unit indicates that the learning condition is satisfied and to learn the learning end angle based on the accumulated and stored end angles; and
    the condition determination unit comprises:
        an over load protection (OLP) operation condition determination unit configured to determine whether an OLP operating condition is satisfied based on column torque and the steering angular speed; and
        a steering angle comparison unit configured to determine whether the steering angle exceeds a preset steering angle.

2. The apparatus of claim 1, wherein the learning unit comprises:
    an average value calculation unit configured to accumulate and store a preset number of end angles whenever the learning condition is satisfied and to calculate an average value of the end angles by averaging the accumulated and stored end angles; and
    a learning end angle determination unit configured to add a presetting value to the average value, compare a calculated addition value with the steering angle, and determine the learning end angle based on a result of the comparison.

3. The apparatus of claim 2, wherein the learning end angle determination unit determines the average value as the learning end angle when the addition value is greater than the steering angle.

4. The apparatus of claim 1, wherein the angular speed limit module comprises:
    a target limit angular speed detection unit configured to detect the target limit angular speed based on the learning end angle and the steering angle;
    a motor angular speed detection unit configured to detect the actual motor angular speed; and
    a limit current detection unit configured to generate the limit current based on the error between the target limit angular speed and the actual motor angular speed and adjust the limit current based on the actual motor angular speed.

5. A steering control apparatus of an electric power steering system for a vehicle, the apparatus comprising:
    a learning module configured to learn a learning end angle based on an end angle of an end of a rack bar based on a steering angle;
    an angular speed limit module configured to detect a target limit angular speed of the vehicle based on the learning end angle and the steering angle, detect an actual motor angular speed based on a steering angular speed, generate a limit current based on an error between the target limit angular speed and the actual motor angular speed, and limit the steering angular speed within the target limit angular speed; and
    a motor current generation module configured to generate a motor current for motor control based on the limit current and a command current received from a steering control module,
    wherein:
    the angular speed limit module comprises:
        a target limit angular speed detection unit configured to detect the target limit angular speed based on the learning end angle and the steering angle;
        a motor angular speed detection unit configured to detect the actual motor angular speed; and
        a limit current detection unit configured to generate the limit current based on the error between the target limit angular speed and the actual motor angular speed and adjust the limit current based on the actual motor angular speed; and
    the limit current detection unit comprises:
        an error detection unit configured to detect the error between the target limit angular speed and the actual motor angular speed;
        a limit current generation unit configured to generate the limit current by performing proportional integral (PI) control based on the error;
        a gain detection unit configured to detect a ramp-up/down gain corresponding to the actual motor angular speed;

a limit current adjustment unit configured to adjust the limit current by applying the ramp-up/down gain to the limit current; and a limit current limit unit configured to limit the limit current within a presetting size.

6. The apparatus of claim 5, wherein the ramp-up/down gain is set in a way to reduce the error between the target limit angular speed and the actual motor angular speed.

7. The apparatus of claim 1, wherein the motor current generation module comprises:

a motor current generation unit configured to generate the motor current by adding the limit current and the command current; and a motor current limit unit configured to limit the motor current within a range of a preset motor current limit value and input the limited motor current to a motor.

8. A steering control method of an electric power steering (EPS) system, the method comprising:

learning a learning end angle based on an end angle of an end of a rack bar based on a steering angle;

detecting a target limit angular speed based on the learning end angle and the steering angle, detecting an actual motor angular speed based on a steering angular speed, generating a limit current based on an error between the target limit angular speed and the actual motor angular speed, and limiting the steering angular speed within the target limit angular speed; and generating a motor current for motor control based on the limit current and a command current received from a steering control module, wherein:

the learning of the learning end angle comprises:
determining whether a preset learning condition is satisfied; and
accumulating and storing the end angle whenever a result of the determination indicates that the learning condition is satisfied and detecting the learning end angle based on the accumulated and stored end angles; and the determining of whether the learning condition is satisfied comprises:
determining whether an over load protection (OLP) operation condition is satisfied based on column torque and the steering angular speed; and
determining whether the steering angle exceeds a preset steering angle.

9. The method of claim 8, wherein the detecting of the learning end angle comprises:

accumulating and storing a preset number of end angles whenever the learning condition is satisfied and calculating an average value of the end angles by averaging the accumulated and stored end angles; and adding a presetting value to the average value, comparing a calculated addition value with the steering angle, and determining the learning end angle based on a result of the comparison.

10. The method of claim 9, wherein the determining of the learning end angle comprises determining the average value as the learning end angle when the addition value is greater than the steering angle.

11. The method of claim 8, wherein the limiting of the steering angular speed within the target limit angular speed comprises:

detecting the target limit angular speed based on the learning end angle and the steering angle;

detecting the actual motor angular speed by applying a gear ratio to the steering angular speed; and generating the limit current by performing proportional integral (PI) control based on the error between the target limit angular speed and the actual motor angular speed and adjusting the limit current based on the actual motor angular speed.

12. The method of claim 11, wherein the adjusting of the limit current based on the actual motor angular speed comprises:

detecting the error between the target limit angular speed and the actual motor angular speed;

generating the limit current by performing the PI control based on the error;

detecting a ramp-up/down gain corresponding to the actual motor angular speed;

adjusting the limit current by applying the ramp-up/down gain to the limit current; and limiting the limit current within a presetting size.

13. The method of claim 12, wherein the ramp-up/down gain is set in a way to reduce the error between the target limit angular speed and the actual motor angular speed.

14. The method of claim 8, wherein the generating of the motor current comprises:

generating the motor current by adding the limit current and the command current; and limiting the motor current within a range of a preset motor current limit value and inputting the limited motor current to a motor.

* * * * *